April 29, 1947. E. H. ULLRICH 2,419,609
MEANS FOR OVERCOMING THE EFFECTS OF EARTH REFLECTIONS IN
DIRECTIONAL ANTENNA SYSTEMS
Filed Sept. 9, 1942 2 Sheets-Sheet 1
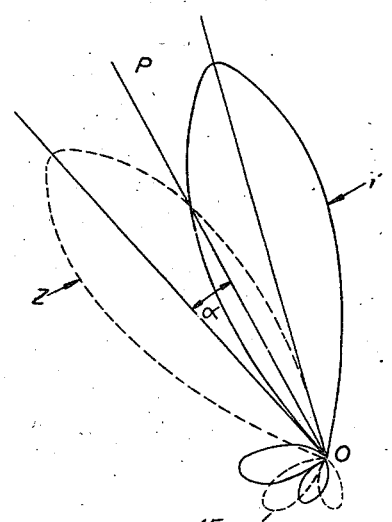
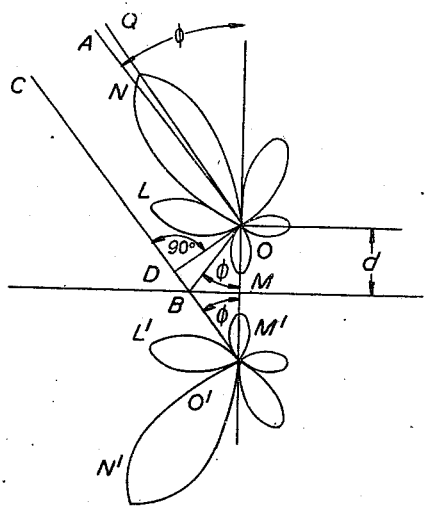
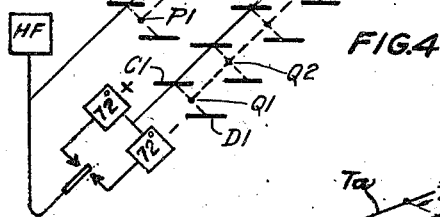
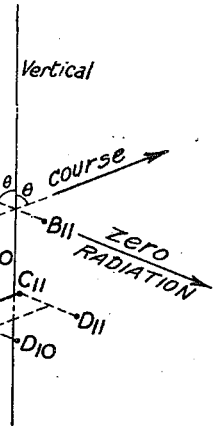
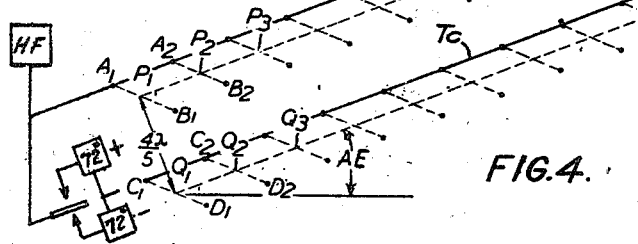
INVENTOR
E. H. Ullrich
BY Loyd Hall Sutton
ATTORNEY Patented Apr. 29, 1947

2,419,609

UNITED STATES PATENT OFFICE 2,419,609

MEANS FOR OVERCOMING THE EFFECTS OF EARTH REFLECTIONS IN DIRECTIONAL ANTENNA SYSTEMS

Edward Hill Ullrich, London W. C. 2, England, assignor to Standard Telephones and Cables Limited, London, England, a British company Application September 9, 1942, Serial No. 457,801
In Great Britain September 25, 1940

6 Claims. (Cl. 250—11)

This invention relates to directional radio antenna systems of the kind used for defining a radio course by the overlapping along said course of two directivity diagrams and more particularly to means for preventing earth reflections from deflecting such "overlapping" radio course produced by an aerial system of variable elevation angle.

The invention will be understood from the following description taken in conjunction with the accompanying drawings in which:

Fig. 1 shows overlapping antenna radiation patterns Z and Y in a vertical plane in free space;

Fig. 2 shows a method for determining the effects of ground reflection upon a single directive radiation pattern N, by utilizing the image reflection N';

Fig. 4 shows a side elevation of an embodiment of applicant's invention; and

Fig. 4a is a perspective view of the lower end of the antenna array shown in Fig. 4, the view being taken from the left of Fig. 4 and at a slight elevation.

Figure 3:
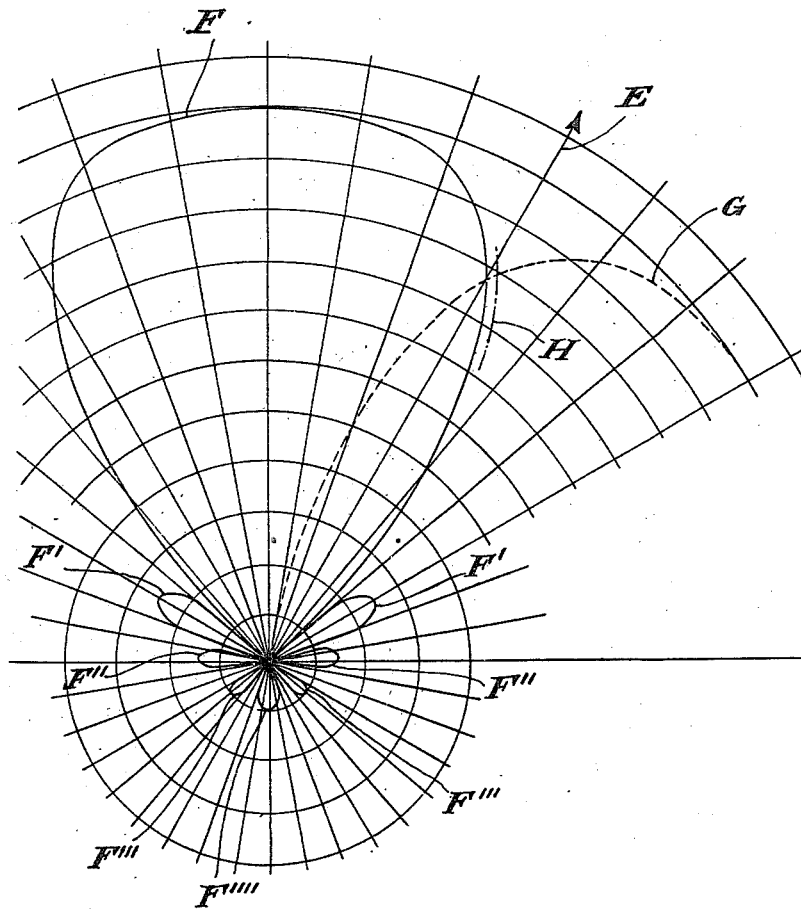
Fig. 3 shows the distortion of the radiation pattern due to ground effects of a pair of antenna systems spaced vertically apart 60°.

It is sometimes necessary to establish in the sky a straight radio course along the axis of a mechanical antena structure, and to ensure that the course remains accurately along this axis whatever its angle of elevation. Precision requirements usually dictate the use of "overlapping" antenna directivity diagrams as Y and Z of Fig. 1 of the drawings accompanying the present specification, the course viz. OP in Fig. 1 being that along which equal signals are received from two different aerial arrays (which may be separate structures or which may utilise the same antenna elements differently excited). If such a system as that shown in Figure 1 were set up and made to operate satisfactorily at a great distance from earth, it would not continue to function in the same manner when brought near the ground. Reflections from earth of beams projected by secondary lobes of the antenna characteristic would interfere in general with, and thus deform, the directivity diagram, causing the course to deviate from its free-space direction.

The antenna characteristic shown in Fig. 2 of the drawings accompanying the present specification where for clearness only one antenna diagram of the two overlapping diagrams is shown, is that relating to free space, the main beam being directed along the axis OQ. Any ray OB, which after reflection travels along a path BC parallel to OA interferes at relatively great distances with the ray OA. The shape of the lobes is thus modified, so that the line of intersection in Fig. 1 is no longer OP, or, in other words, the course has shifted. It is required to prevent this change of course.

The effect of the earth is to produce reflected rays which may be considered as coming from the image of the original aerial system, and the signal at a distance will be the resultant of the signals produced by the two systems. The ideal solution would be to reduce all secondary lobes of the directivity curve to negligible size and thus avoid disturbing reflections altogether, but this involves abnormally great aerial dimensions at wavelengths of the order of 1 metre.

It is important to note here that if the phase of the various elements of an antenna array is reckoned relatively to a point of symmetry of the antenna structure—and such a point of symmetry exists in all the more commonly used aerial systems—all rays of the directive diagram are in phase or exactly out of phase. Furthermore, the phase of any ray of one lobe is, in general, opposite to that of a ray of any adjacent lobe. Thus, if in Fig. 2 of the drawings accompanying the present specification the phase of rays in lobe N is called positive, the phase of rays in lobe L will be negative and that of rays in lobe M again positive. It is only in special structures representing, for example, a limiting case in which a lobe such as L has been reduced to zero dimensions, that two adjacent lobes have the same sign.

In Fig. 2 the free-space directivity diagram is shown with lobes, such as N, L and M and the reflection image directivity diagram with lobes such as N', L' and M'. A ray OB, reflected from the ground at B, appears to arrive from O' following the straight line O'BC. There is a phase change at reflection which depends on the nature of the terrain; in the case of an ideal conducting reflector it is 180 degrees.

A phase change of 180° will be assumed. The image aerial excitation must, then, be considered as being 180 degrees out of phase with that of the real aerial. The reflected rays in any direction BC (see Fig. 2), have, with respect to the direct rays, an additional phase change corresponding to distance O'D, where OD is perpendicular to O'BC.

It will be observed that, if the course is to remain unchanged by earth reflections, the radius vector OP (see Fig. 1) of diagram Y and the radius vector OP of diagram Z must be affected equally by the reflected rays. In general, however, the reflected ray parallel to OP has different amplitudes for the images of the Y and Z diagrams respectively. It may even have opposite signs. Furthermore, these relative amplitudes and signs vary with the elevation.

It is possible to mitigate this trouble by changing automatically the spacing or the excitation of the antenna elements as the elevation is changed, doing this in such a way as to affect the main ray OP equally in both positions Y and Z of the directivity diagram. This is, however, a complicated process.

A simpler method according to this invention is to choose an aerial, the secondary lobes of the free space diagram of which are all small compared with the main lobe, and to adjust the height above earth of the centre O of this aerial in such a way that the phase change corresponding to O'D of Fig. 2 is an odd multiple of 90 degrees. The direct and reflected ray vectors will then be at right angles, and if the reflected ray is a small quantity of the first order relative to the direct ray, the resultant amplitude will differ from the amplitude of the direct ray by a small quantity of the second order.

Let $d$ be the height of the centre of the antenna above earth (see Fig. 2) and $\phi$ the angle made by the course with the vertical. Then O'D=$2d \cos \phi$.

It is, then, clear that, in order to ensure that the main and reflected rays add at right angles, the height $d$ above earth must vary with $\phi$ so that:

$$2d \cos \phi = (2n+1) \frac{\lambda}{4}$$

where $n$ is any integral number and $\lambda$ is the operating wavelength.

It will be noted that the height $d$ need not be more than doubled for a change of course from zero to sixty degrees with the vertical. If smaller height variations are required, the value of $n$ may be changed abruptly anywhere.

In order to fix the position of earth, a conducting mat may be put under the mechanical structure. The larger the mat, the more satisfactory the operation. To cover an elevation variation from vertical to sixty degrees from the vertical, a copper mat might be tried extending on each side of the base of the structure by a distance at least four times the height of the highest element, and preferably more.

Assume for example that it is required to sweep the course over an angle varying from zero to 45 degrees with the vertical.

Two antenna arrays for example of the Yagi type may be used each consisting of a row of eleven dipoles spaced $\lambda/4$ and excited by a straight transmission line. Each dipole of any one array is thus excited with current having a phase lag of $\pi/2$ with respect to the dipole immediately preceding it. The directivity diagram is that given in Fig. 3 of the drawings accompanying the present specification showing a main lobe F and successive smaller lobes F', F'', F''' and F''''. If the maximum amplitude of the main lobe is eleven, that of the other successive lobes over 180 degrees arc is 2.45, 1.53, 1.2, 1.04 and 1.

The two antenna arrays resulting in a radiation pattern as illustrated in Fig. 3 are set at 60 degrees to one another and in the same plane, and their height is determined in accordance with the law given above. They are excited alternately and must not have appreciable coupling.

The equi-signal course, indicated at E in Fig. 3, is then the bisector of the angle between the two arrays which produce diagrams F and G, and the amplitude along the course is 8.6 if that of the main lobe is eleven. When the course is at an angle $\theta$ with the vertical, the reflected ray is at an angle $\pi-2\theta$ with the course. The maximum change of amplitude of the course ray is when $$\theta = \frac{\pi}{4}$$

since in the case of one of the diagrams the reflection comes from the axis of the main secondary lobe of amplitude 2.45. In Fig. 3 the chain-dotted curve H is that part which is of interest of the diagram after distortion by the reflected ray; the dotted curve G is the diagram of the conjugate Yagi array; it suffers negligible distortion due to reflections. It can be seen from Fig. 3 that reflection has thus shifted the course about half a degree only. When $\theta$ is less than 45°, the shift is always less, usually considerably less.

If it is desired to work with $\theta$ greater than 45°, it is necessary to use a more directive diagram than that of Fig. 3 i. e., to have more than eleven dipoles in this type of array.

The principles above described apply equally to a course set up in space by transmitting aerials and to a "homing" course corresponding to receiving aerials.

The directivity curve of a horizontal dipole a distance $b\lambda$ above a perfect conducting earth is given by:

$$P = \sin (2\pi b \sin \theta)$$

where P is the radius vector at $\theta$ with the vertical. When, therefore, such an earth exists, its position may be determined and the copper mat rendered unnecessary. The position of such an earth is, however, liable to change with weather conditions.

A second solution of the problem will now be described.

It is well-known and indeed self-evident when the directivity diagram of an aerial system is being calculated that, if the directivity curve of an antenna made up of a number of similar elements is given by:

$$r = f(a)$$

where $r$ is the radius vector at an angle $a$, and, if each of these elements is replaced by a composite element (say a pair of dipoles) having a directivity curve $$r = F(a)$$

then the directivity curve of the new system will be given by:

$$r = f(a) \cdot F(a)$$

Thus zero radiation can be obtained in any given direction by choosing as composite element one having zero radiation in that direction.

One such composite element is a pair of parallel dipoles separated a quarter of a wavelength, the excitation of one dipole, which will be referred to as A lagging a quarter of a cycle on that of the other dipole which will be referred to as B. The directivity curve is heart-shaped, radiation being zero in the direction AB. If, then, it is arranged that, as the elevation of the array changes, the direction AB is also changed so as to coincide with the direction of departure of the ray, which after reflection at the earth will be parallel to the radio course, it is ensured that this ray is always of zero intensity and the equi-signal course of the overlapping diagrams unchanged.

The system shown in Fig. 4 of the drawings accompanying the present specification consists of four rows of horizontal dipoles:

$A_1 \ldots A_{11}$, $B_1 \ldots B_{11}$, $C_1 \ldots C_{11}$, and $D_1 \ldots D_{11}$ These four rows of horizontal dipoles are parallel to each other and are arranged at an angle of elevation AE which is adjustable by moving the array to different angular positions in the vertical plane of the array. The axis of each dipole is normal to the plane of the paper in Figure 4. The lower end of the array composed of the four rows of horizontal dipoles is shown in perspective in Figure 4a. The B's and D's are reflectors spaced a quarter of a wavelength from the corresponding A's and C's respectively and so oriented that the vertical bisects the angle between the radio course on the one hand and the directions BA and DC on the other. Each dipole pair, such as dipoles $A_{11}$ and $B_{11}$, constitutes an elementary antenna unit having a direction of zero radiation indicated by the arrow marked "Zero radiation." The direction of the course established by the array is indicated by the arrow "Course" in Figure 4. As explained above, the dipole pairs are oriented so that the angle between the "Course" direction and the direction of zero radiation is bisected by the vertical line in Figure 4 marked "Vertical." In other words, the two angles marked $\theta$, $\theta$ are equal. The reflectors may be excited by radiation only. The A and C series are each excited from a source HF through lines Ta and Tc as in the arrangement described with reference to Fig. 3, but the C series is excited one fifth of a cycle out of phase with series A, the phase being made to alternate between lagging and leading so as to obtain overlapping directivity curves, as by means of suitable phase shifting devices marked 72°+ and 72°− included in alternate energizing circuits for the C row of dipoles. The spacing of A row from the C row, and therefore, of the B row from the D row is four fifths of a wavelength. The orientation of any elements $A_n$ $B_n$ and $C_n$ $D_n$ is effected by pivoting them about the centre points $P_n$, $Q_n$ respectively of $A_n$ $B_n$ and $C_n$ $D_n$.

The dotted lines joining the centers of the dipoles of each pair and including the pivot points $P_1$, $P_2 \ldots P_n$, and $Q_1$, $Q_2 \ldots Q_n$, represent suitable pivotal mountings for the dipole pairs by which the pairs may be adjusted to different angular positions within the vertical plane in which the radio course is established.

The above solution thus consists in forming an aerial array from a plurality of elementary antenna systems, each of which has a direction of zero radiation and providing means for rotating, when the direction of the course is changed, each of the elementary systems in such a way that the vertical is the bisector of the angle between the course direction and the direction of zero radiation of the elementary systems.

What is claimed is:

1. An arrangement for defining a radio course in a vertical plane and at a predetermined angle of elevation comprising an antenna system for producing two overlapping radiation diagrams the intersection of which forms said radio course, said antenna system comprising a plurality of elementary antenna units each of which has a direction of zero radiation, the effects of earth reflection being overcome by orientation of said elementary units so that a vertical line bisects the angle between the defined course direction and the direction of zero radiation of said elementary units.

2. An arrangement for defining a radio course in a vertical plane and at a predetermined angle of elevation comprising an antenna array including two parallel rows of dipole pairs arranged in the same vertical plane each dipole pair comprising a driven dipole and a parallel reflector dipole and the dipole pairs of each row being spaced one quarter of a wavelength apart, means for feeding one of the two rows of driven dipoles with current having alternately a leading and lagging phase with respect to current fed to the other row so as to produce two overlapping radiation diagrams for defining the course, and means for mounting each dipole pair for angular adjustment in said vertical plane to a point such that a vertical line bisects the angle between the defined course direction and the direction of zero radiation of said dipole pairs.

3. An arrangement according to claim 2 wherein the driven dipole and reflector dipole of each dipole pair are spaced one quarter of a wavelength apart.

4. An arrangement according to claim 2 wherein said rows of driven dipoles are spaced four-fifths of a wavelength apart.

5. An antenna array for defining a radio course in a vertical plane and at different adjustable angles of elevation comprising a plurality of elementary antenna systems each having a direction of zero radiation, said array being mounted for movement to different angles of elevation in said vertical plane, and means for mounting each elementary antenna system for angular adjustment in said vertical plane to a position such that, for each angular position of said array, a vertical line bisects the angle between the defined course and the direction of zero radiation of the elementary antenna system.

6. In an antenna array for defining a radio course in a vertical plane and at different adjustable angles of elevation by means of a plurality of elementary antenna units each of which has a direction of zero radiation, the method of overcoming the effects of earth reflection which consists in adjusting the angular position of each elementary antenna unit for each angular direction of said course so that a vertical line is the bisector of the angle between the defined course and the direction of zero radiation of the antenna unit.

EDWARD HILL ULLRICH.

REFERENCES CITED

The following references are of record in the file of this patent:

UNITED STATES PATENTS

| Number | Name | Date |
|---|---|---|
| 2,227,929 | Goddard | Jan. 7, 1941 |
| 2,127,954 | Dunmore | Aug. 23, 1938 |
| 2,294,882 | Alford | Sept. 8, 1942 |
| 1,885,151 | Sterba | Nov. 1, 1932 |
| 2,038,539 | Carter | Apr. 28, 1936 |
| 2,186,554 | Perroux | Jan. 9, 1940 |
| 2,194,741 | Davies | Mar. 26, 1940 |
| 2,268,107 | Bond | Dec. 30, 1941 |